Aug. 4, 1964　　P. H. PELLEY　　3,142,864
MEANS AND METHOD FOR THE FORMATION OF PANELING
HAVING A FOAMED PLASTIC CORE
Filed Oct. 27, 1959　　9 Sheets-Sheet 1

INVENTOR.
Perry H. Pelley.
BY
Ezekiel Wolf, Wolf & Greenfield
attorneys.

FIG.4

Aug. 4, 1964 P. H. PELLEY 3,142,864
MEANS AND METHOD FOR THE FORMATION OF PANELING
HAVING A FOAMED PLASTIC CORE
Filed Oct. 27, 1959 9 Sheets-Sheet 5

INVENTOR.
Perry H. Pelley
BY
Ezekiel Wolf, Wolf + Greenfield
attorneys.

Aug. 4, 1964 P. H. PELLEY 3,142,864
MEANS AND METHOD FOR THE FORMATION OF PANELING
HAVING A FOAMED PLASTIC CORE
Filed Oct. 27, 1959 9 Sheets-Sheet 6

FIG.9

INVENTOR.
Perry H. Pelley
BY
Ezekiel Wolf, Wolf + Greenfield
attorneys.

Aug. 4, 1964    P. H. PELLEY    3,142,864
MEANS AND METHOD FOR THE FORMATION OF PANELING
HAVING A FOAMED PLASTIC CORE
Filed Oct. 27, 1959    9 Sheets-Sheet 9

INVENTOR.
Perry H. Pelley
BY
Ezekiel Wolf, Wolf + Greenfield
attorney

United States Patent Office 3,142,864
Patented Aug. 4, 1964

3,142,864
MEANS AND METHOD FOR THE FORMATION OF PANELING HAVING A FOAMED PLASTIC CORE
Perry H. Pelley, Wichita, Kans., assignor to Tru-Scale, Inc., Wichita, Kans., a corporation of Kansas
Filed Oct. 27, 1959, Ser. No. 848,996
3 Claims. (Cl. 18—4)

The present invention relates to a means and method of forming paneling or laminations having a foamed plastic core.

This invention represents a substantial improvement in copending applications Serial No. 651,270, filed April 8, 1957, issued as Patent No. 3,037,897, for a Method of Making Structural Panel Articles, and 652,222, filed April 8, 1957, issued as Patent No. 2,908,527, for Production of Structural Articles, and is a continuation-in-part of application Serial No. 814,624, filed May 20, 1959, for Means and Method of Making Laminated Panel.

A lamination of a foamed plastic core interposed between paper webs has particular utility in forming shipping cartons such as disclosed in Patent No. 2,770,406. Because of the relatively high cost of the plastic core material, such paneling or boxboard must be fabricated economically to be competitive with conventional corrugated board. While fabricating apparatus has been developed for automatic manufacture of this boxboard, the rate of production, capable with this apparatus is extremely limited. (See for example United States Patent 2,872,965 issued February 10, 1959.)

Thus, it is an object of the present invention to provide a means and method by which panels having foamed plastic cores can be produced at a rate in excess of between 50 and 100 linear feet per minute. These rapid production rates are possible with very low density foamed plastic cores having densities lower than the order of a pound per cubic foot. Such low density panels are desirable because of their lightness and economical use of foamable plastic material.

In the present invention, a pair of endless belts are each formed with a plurality of rigid interlinked backing plates providing a non-yielding surface or restraint. These belts are positioned with closely adjacent parallel sections, defining a confined area, and are mounted for movement through these parallel sections from the front of the machine rearwardly. Also provided are a pair of flexible insulating webs having sections moveable through and interposed between the adjacent parallel sections of the belts. At the forward end of the machine there is provided a feed mechanism and distributor of novel design for uniformly distributing foamable material (preferably foamable polystyrene beads) between the flexible insulating webs. A steam plenum is also provided at the forward end of the machine adjacent the distributor with a plurality of steam probes projecting into the confined area between the flexible insulating webs.

In the preferable method of this invention as embodied in the operation of the machine, a pair of continuous sheets of material such as kraft paper are fed from suitable let-off rolls between the flexible insulating webs and are moved rearwardly with the webs. Simultaneously, foamable polystyrene beads, preferably partially pre-foamed, are gently distributed from the distributor across the width of the kraft paper sheets at the forward end of the confined area. As these beads are carried rearwardly, between the moving kraft paper sheets, steam is introduced into enveloping relationship with the beads at the forward end of the confined area. This live steam reacts with the beads, causing them to foam and occupy the full volume of the confined space, exerting outward pressure against the rigid backing members and insulating belt. The beads when foamed, fully occupy the confined space and coalesce as they are moved rearwardly. As the beads cool, the foaming action stops and the lamination thus formed may be removed from the restraint of the confining area.

The foregoing apparatus and process introduces the foam activating medium in situ at the time the foamable beads are first introduced between the paper sheets. The probes of the insulating steam plenum project well into the confined area and thereby heat the foamable material from within the lamination. This arrangement effectively minimizes the amount of heat required for expanding the foamable beads. The insulating webs also reduce heat requirements for foaming. These features substantially eliminate problems of dissipating excessive heat which otherwise would occur if exterior heating means were utilized.

This internal heating arrangement also contemplates the use of vented sides at the edges of the belts and insulating webs. These vented sides maintain the foaming beads within the confined area, while simultaneously allowing the venting of spent steam, air and water vapors.

Positive cooling means are also unnecessary as the carrying belts and insulating webs do not act as heat reservoirs to continue the expansion cycle after the foamable material has expanded to the desired volume. Heat control means along the length of the machine are not required. The insulating belt slowly dissipates the heat of the steam as the panel moves down the length of the machine, eliminating the possibility of bead collapse which would occur with a rapid cooling cycle.

The feed and distribution mechanism gently meters and disperses the foamable beads across the moving paper sheet. The bead feed and distributor are uniquely designed so that the preferably pre-expanded beads having a very low mass, are easily controlled for proper distribution. This feed and distribution apparatus provides both a mechanical volumetric metering and a gentle air feed to attain the desired control.

The restraining belts maintain uniformity of thickness in the confined area to assure the desired uniformity in the end product.

These and numerous other objects and advantages of the present invention will be more clearly understood when considered in conjunction with the accompanying drawings in which.

The machine shown in the drawings is illustrative of the present invention. This machine is formed with an elongated frame supported by a plurality of I beams 1 arranged in two parallel rows. The I beams 1 are secured at their base by suitable means and project upwardly to support the upper and lower frame assemblies 2 and 3 respectively (best illustrated in FIGS. 3 and 9). The upper frame assembly 2 comprises a plurality of elongated parallel inner rails 15 preferably five in number. These rails are rigidly and longitudinally secured to the lower edges of cross beams 10'. A pair of outer rails 5 are secured to the upper surfaces of the cross beams 10'.

Side supports 6 are also secured to the cross beams 10'. These supports 6 in turn support the rollers 42 for the insulating web more fully described hereafter.

The upper frame of the assembly, preferably, should be vertically adjustable over a range of at least one inch. Supporting blocks 200 parallel to the rails 15 have intermittent bearing plates 201 adjacent each I beam. Screws 202 bear against the plates 201 and are in turn supported by threaded bearings 203 which are secured to the I beams. At the ends of the side rails 6 there are provided side bearing plates 7 having elongated openings 8 adapted to support a rotatable shaft.

The lower frame assembly is formed with inner rails 9, preferably five in number, rigidly secured to and above the cross beams 10. The number of rails will, of course, vary with the machine width. Side rails 11 are secured on either side edge of the cross beams 10 and are adapted in turn to be secured to support the roller assembly for the insulating web more fully described hereinafter. The cross beams 10 may be rigidly secured by suitable means to the I beam. The lower frame assembly 3 is also provided with side bearing plates 12 (FIG. 3) similar in construction and corresponding in location to side bearing plates 7 on the upper frame assembly 2. The upper frame assembly 2 and lower frame assembly 3 are secured between the I beams 1 with the inner rails 15 and 9 spaced apart a selected distance dependent upon the thickness of the composite paneling to be formed on the machine. Upper frame assembly 2 may be raised or lowered with respect to frame assembly 3 by adjusting the screws 202.

Figure 1:
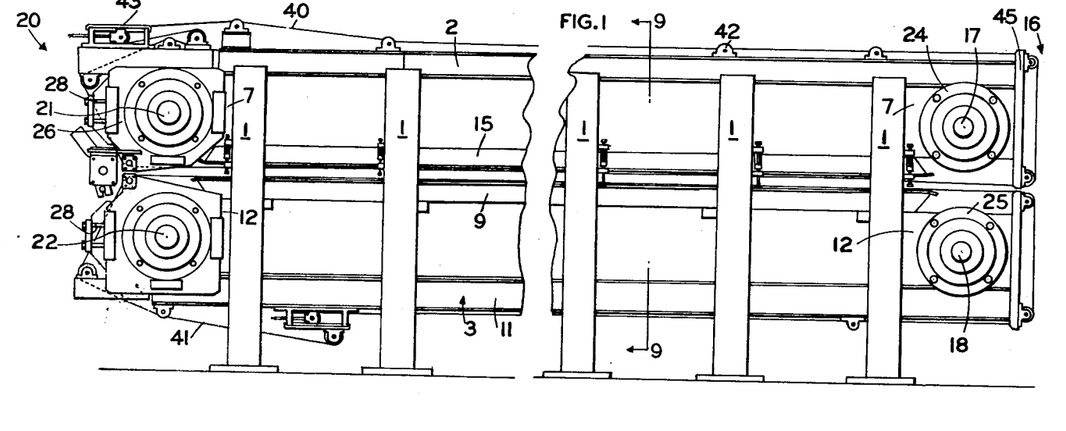
FIG. 1 is a side elevation of a machine embodying my invention, with portions omitted for clarity.
Figure 2:
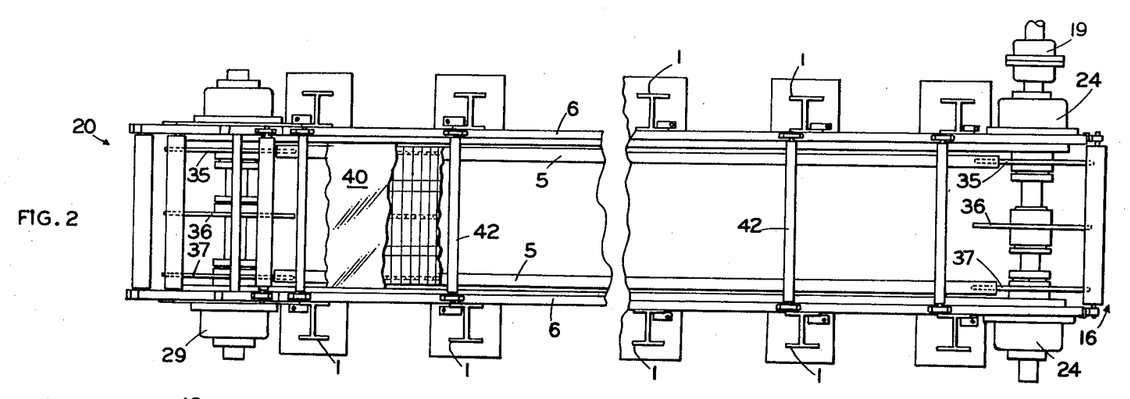
FIG. 2 is a top plan view of the device shown in FIG. 1 with portions removed for clarity.

Mounted in openings 8 and 12 (FIG. 3) at the rear end 16 of the machine, and suitably supported in bearings 24 and 25 are shafts 17 and 18 (FIGS. 1 and 2). Each of these shafts 17 and 18 are suitably geared or chain coupled for synchronous operation. The gears are operatively engaged through a coupling 19 to a suitable power source (not shown).

At the forward end 20 of the machine, shafts 21 and 22 are mounted in adjustable bearing plates 26 and 27 respectively. The bearing plates 26 and 27 in turn are slideably secured to the side bearing plates 7 and 12 respectively. The plates 26 and 27 are longitudinally adjustable by means of adjusting screws 28 threaded through flanges 208 of the plates 26 and 27. The shafts 21 and 22 project respectively through the openings 8 and 32 (FIG. 3).

Each of the shafts 17, 18, 21 and 22 carry three sprockets 35, 36 and 37, preferably uniformly spaced on the shaft and intermediate the side rails 6 and 11. Two sets of endless conveyor belts 102 and 103 are carried by these shafts with one set operatively engaging and circumscribing the sprockets 35, 36 and 37 mounted on shafts 21 and 17. The other set is operatively engaged by the sprockets mounted on shafts 22 and 28.

Figures 3, 10:
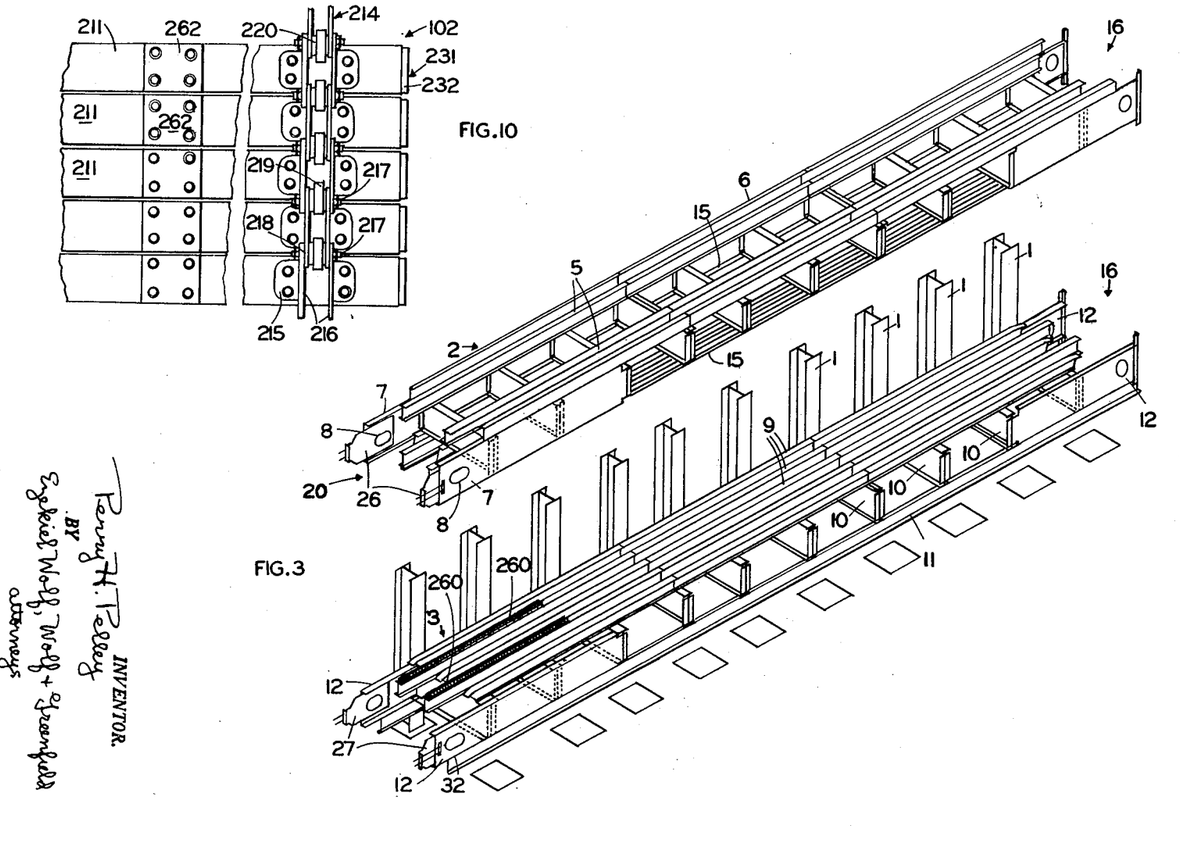
FIG. 3 is a perspective somewhat schematic exploded view of various components of the frame assembly with portions omitted for clarity.
FIG. 10 is a fragmentary plan view of a portion of the restraining belt.
Figure 4:
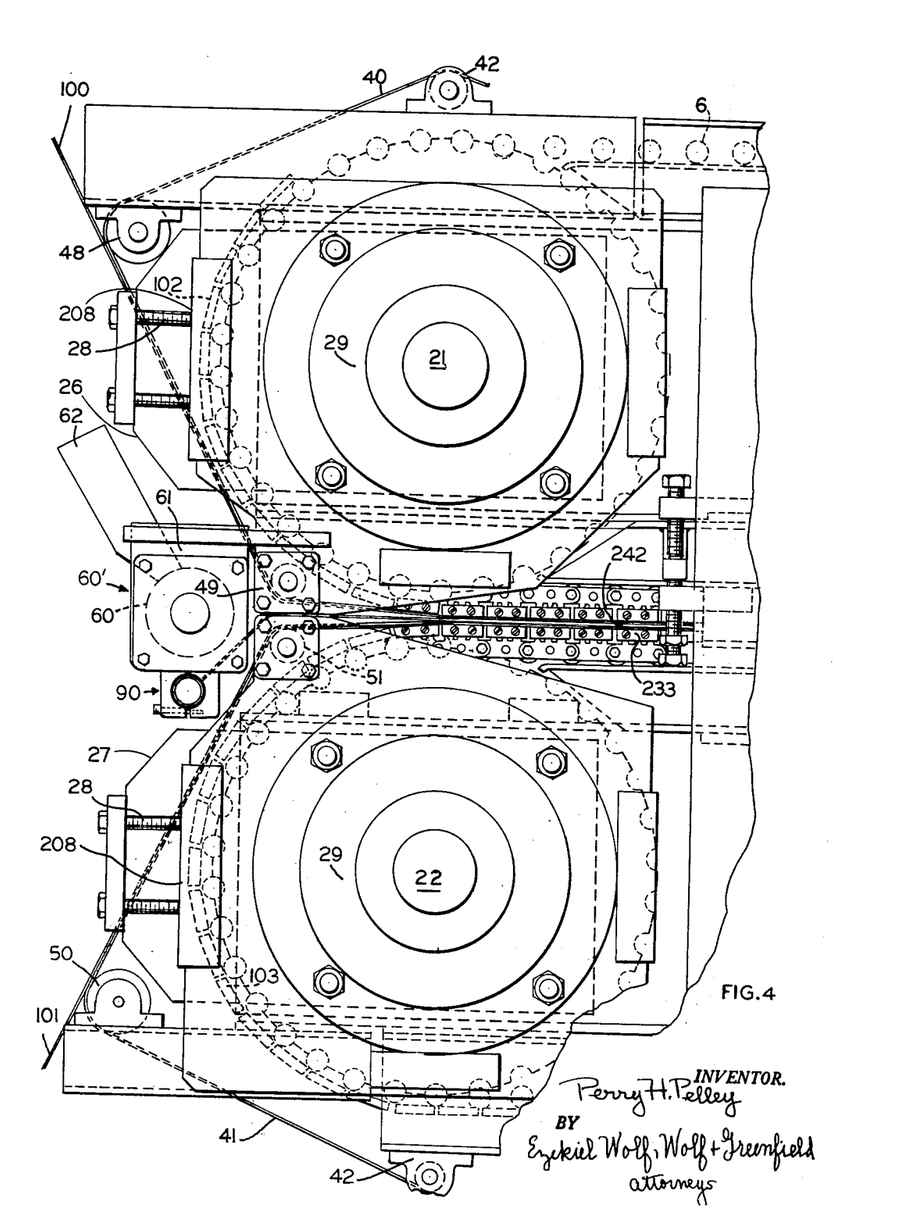
FIG. 4 is an enlarged side elevational detail of the forward end of the machine.
Figure 9:
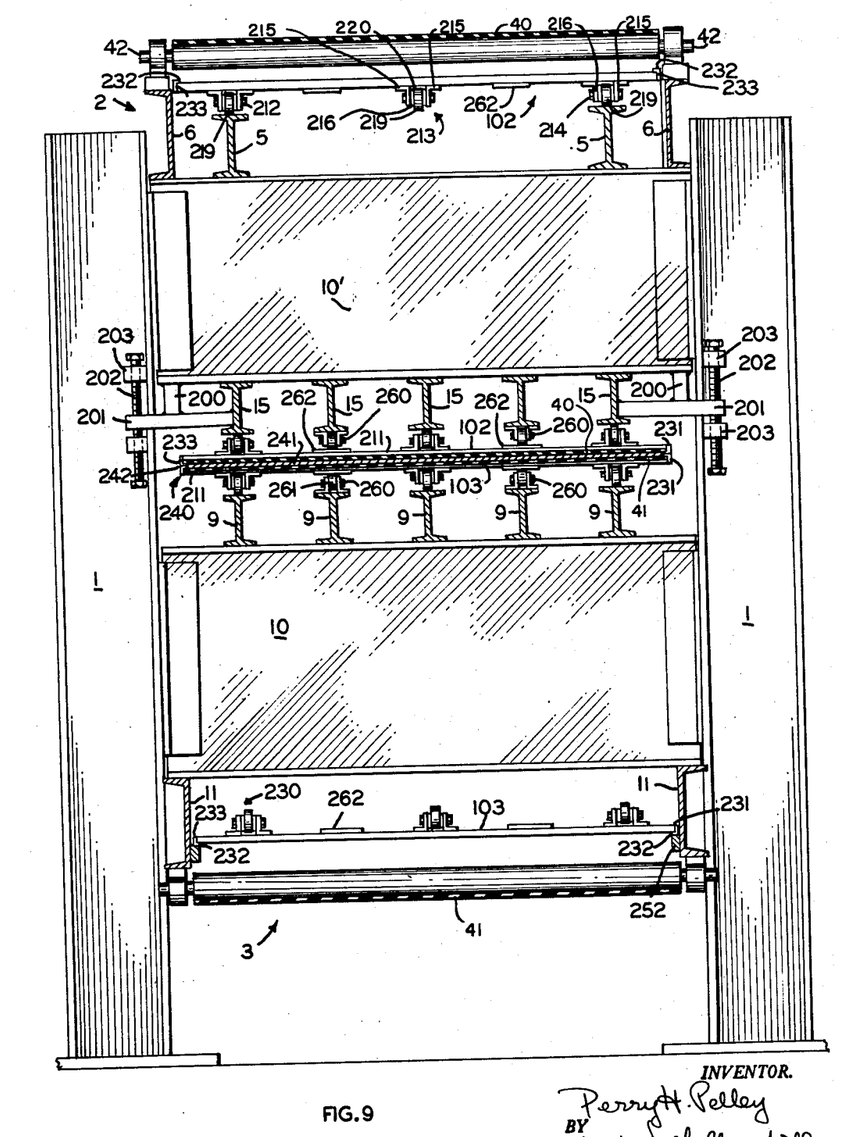
FIG. 9 is a cross sectional elevation taken along the line 9—9 of FIG. 1.
Figure 11:
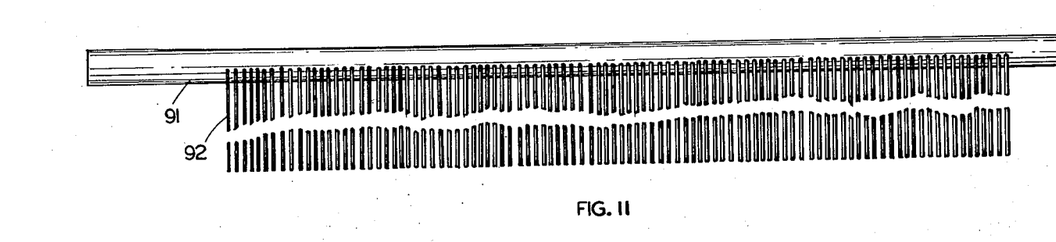
FIG. 11 is a top plan fragmentary view of the plenum.

Each of the endless conveyor belts 102 and 103 are identical in construction and are best illustrated in FIGS. 4, 9 and 10. A plurality of transverse slats 211 (FIG. 10) are connected at their side edges in series by three sets of links 212, 213 and 214 (FIG. 9). These slats are rigid and non-yielding and are adapted to withstand substantial stresses. Each set of links is formed with angular journal members 215 having facing walls 216 projecting normally from the slats. The opposite walls 216 of adjacent journal members are laterally staggered to permit an interengaging facing arrangement as illustrated at 218 (FIG. 10). The adjacent walls are pivotally interconnected by pins 217. The pins 217 also rotatably support rollers 219 intermediate the walls 216 with bushings intermediate the rollers 219 and the walls 216 as indicated at 220. The rollers 219 project outwardly beyond the edges of the walls 216 which are parallel to the wide surface of the slats 211 (FIG. 9).

The belt 102 which is driven by shafts 21 and 17 rotates with the rollers 219 of link 212 and 214 bearing against the upper surfaces of the longitudinal beams 5 on top of the upper frame assembly 2 (FIG. 9). These same rollers bear against the lower surface of the outermost inner rails 15 on the lower surface of the upper frame assembly 2. The rollers 219 of links 213 engage the centermost beam 15 as they rotate about the lower portion of the upper frame assembly 2, but are free on movement across the top of the upper frame assembly. The rollers 219 of links 212, 213 and 214 of the lower belt 103 bear against the upper surface of the outermost inner rails 9 and the center rail 9 as they pass over the upper portion of the lower frame assembly 3. As they pass beneath the lower frame assembly 3, they are unengaged as illustrated at 230 (FIG. 9).

Figure 5:
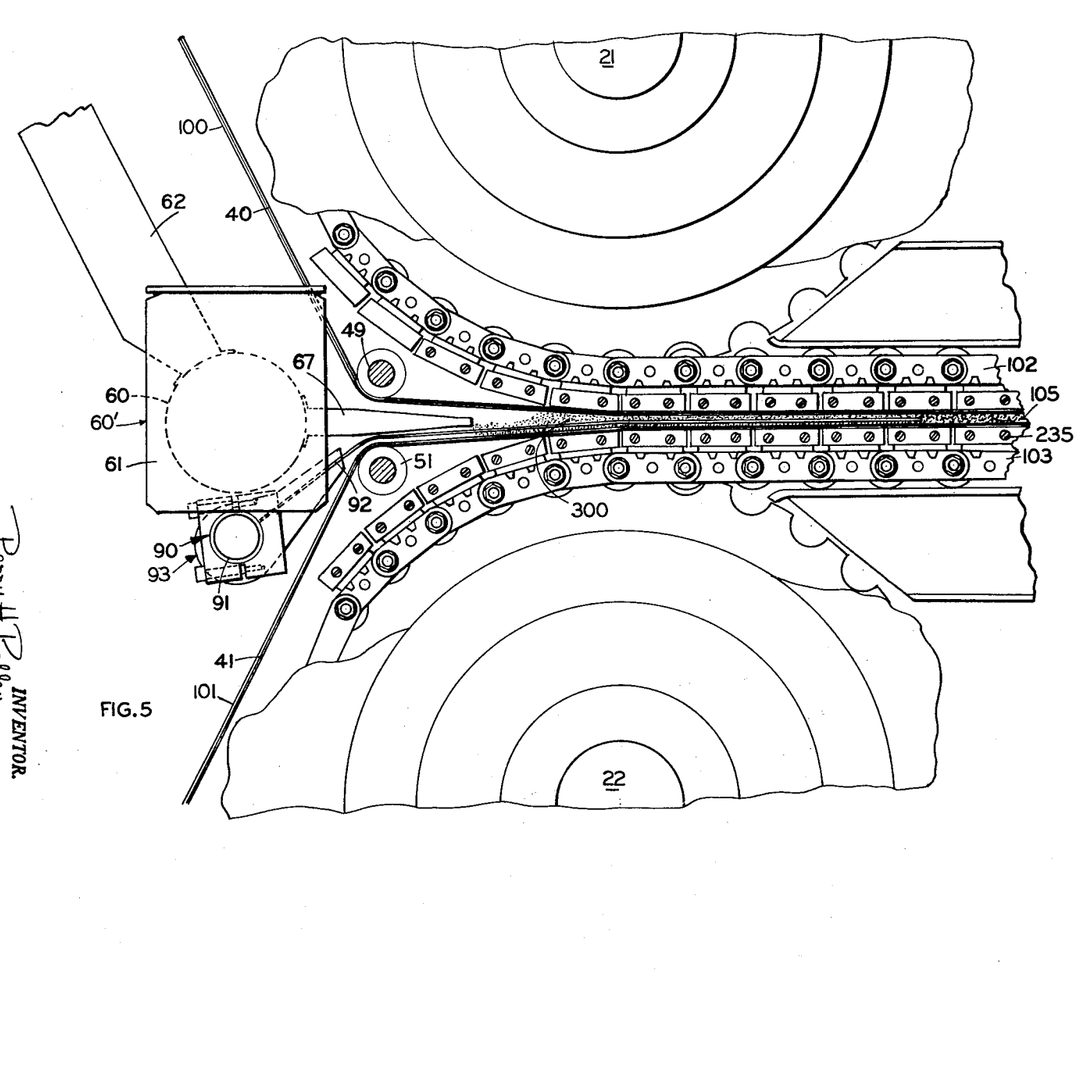
FIG. 5 is a further enlarged side elevational detail of the forward end of the machine.

Side venting plates 231 are provided at the outer ends of each of the slats 211. These side venting plates 231 are preferably formed of a plastic material such as laminated phenolic having some degree of resilience. Each side venting plate has an angular cross section with one leg 232 (FIG. 9) in facing relation with the outer surface of the slats 211, and the other leg 233 laying over the end edge of the plates 211. These plates may be secured to the end edges by screws 235 (FIG. 5). The facing legs 232 of the side vent plates in the area of the belts 102 and 103 between the upper and lower frame assemblies 2 and 3 which is illustrated in FIG. 9 at 240 define the sides of a confined area 241. The facing surfaces 242 of legs 232 are adapted to be moved toward and away from each other by adjustment of the threaded shafts or screws 202. Normally these side vent plates are spaced apart a distance less than the normal diameter of the preexpanded beads which are fed between the endless belts, as will appear more clearly hereinafter. On the lower endless belt 103 circumscribing the lower frame assembly 3, the side vent plates 231 act as bearing supports. These plates 231 ride on the rails 252 which are in turn rigidly secured to lower side rails 11.

As is best illustrated in FIG. 9 and in FIG. 3, preferably four sets of auxiliary rollers 260 are secured to each of those rails 9 and 15 positioned on either side of the centermost rails 9 and 15. These sets of rollers 260 are positioned at the forward end 20 of the machine and provide additional restraining forces in the area of the confined space 241 which is subject to the greatest pressures of the expanding forces created by the foaming styrene. The rollers 261 actually bear against plates 262 (FIG. 10) which may be formed of hardened metal and secured suitably to the inner surfaces of the slats 211.

Insulating flexible endless and continuous webs 40 and 41 preferably formed of rubber or the like encircle the upper and lower restraining belts respectively. These insulating webs 40 and 41 pass between the inner rails 15 and 9 and define the wide surfaces of the confined space 241, within which the laminated panel is formed. The web 40 is supported above the upper frame assembly 2 by a series of rollers 42 suitably journalled at their ends and supported on side rails 6. A suitable tensioning device for adjusting the tension of the web 40 may be provided as illustrated at 43 (FIG. 1). At the rear end 16 of the machine, the web 40 is supported by rollers 42 mounted in journals, in turn supported on vertically oriented beams 45 at the end of the side bearing plate 7.

At the forward end 20 of the machine the web 40 extends about rollers 48 and 49 (see FIGS. 4 and 5). These rollers are mounted in journals, in turn mounted respectively to portions of the frame. Roller 49 positions the web 40 away from the restraining conveyor belt 102 in an area just before the web enters into the confined area 241 between the parallel portions of the restraining belts 102 and 103. Lower web 41 is similarly engaged by rollers 50 and 51 corresponding respectively with rollers 48 and 49. Rollers 49 and 51 are positioned so that the webs 40 and 41 extending over them form a very acute angle from the rollers 49, 51 to the beginning of the confined area 241. The webs 40 and 41 between the conveyor belts, are spaced closely together over the length of the confined area. Ordinarily the webs 40 and 41 may be no more than one fourth to three quarters of an inch apart. It should be understood, however, that the thickness is primarily determined by the desired end products. The frictional engagement of the webs 40 and 41 with the conveyor belts 102 and 103 cause the webs 40 and 41 to move with the conveyor belts during the operation of the machine.

Secured intermediate opposite side plates 7 is the feed and distributor 60' for the foamable material (FIGS. 4 and 5).

Figures 6, 7, 8:
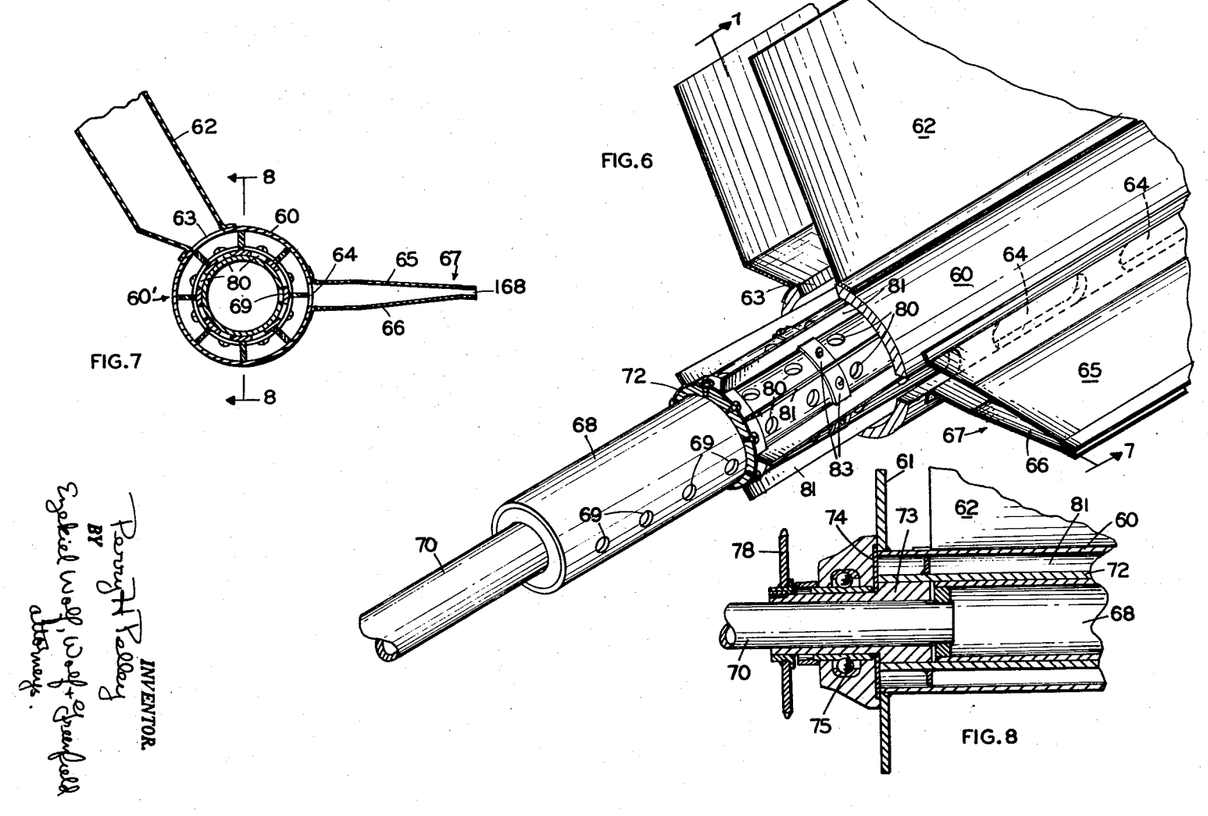
FIG. 6 is a fragmentary perspective view of the distributor and feed mechanism at the forward end of the machine.
FIG. 7 is a cross sectional view taken substantially along the line 7—7 of FIG. 6.
FIG. 8 is a cross section taken substantially along the line 8—8 of FIG. 7.
Figure 12:
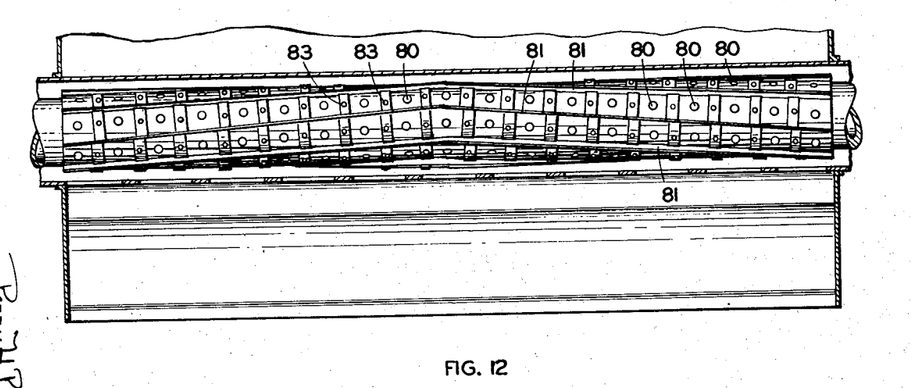
FIG. 12 is a cut away fragmentary plan view of the distributor showing the interior thereof.

The distributor 60' comprises a cylindrical hollow case closed at its ends and supported by supporting plates 61 suitably secured to the frame of the machine. The casing 60 is provided with an elongated hopper 62 communicating with the interior of the casing 60 through an elongated slot 63 (FIGS. 4 to 8). An outlet orifice formed as an elongated slot or series of slots as indicated at 64 is also longitudinally formed in the casing 60. Flat guide plates 65 and 66 straddling the orifice 64 form a projecting nozzle 67 having an elongated opening 168 longitudinally aligned with the forward end of confined area 241 between the webs 40 and 41. The nozzle 67 projects inwardly between the webs 40 and 41 beyond the guide rollers 49 and 51 as illustrated in FIG. 5. As illustrated, the nozzle is tapered to minimize the space it occupies. Coaxial with the casing 60 and extending internally the length of the casing, is an air manifold 68 having a series of holes 69 formed therein in longitudinal alignment and opposite orifice 64. Air is supplied to the manifold through a conduit 70 passing through the end wall of the casing 60 and connected by suitable means to a source of air pressure. The manifold is suitably supported coaxially with the cylindrical casing 60. Coaxial with manifold 68 and interposed between it and casing 60 is a sleeve 72. The sleeve 72 extends beyond the air manifold 68 at its ends and is rigidly secured to a rotatable collar 73 (FIG. 8). The collar 73 projects outwardly beyond the end wall 74 of the casing 60 and is in rotating sliding relation with the conduit 70. The collar 73 is suitably supported for rotation by bearing means 75. The outer end of the collar 73 has keyed to it a sprocket or gear 78. This sprocket or gear 78 is adapted to be connected to a power source not shown, for rotating the sprocket 78, collar 73 and sleeve 72 at a selected rate of speed. The sleeve is formed with a series of holes 80, arranged in a series of longitudinal spiral lines extending the length of the sleeve 72. These lines of holes 80 are symmetrically angularly arranged as illustrated in FIG. 12 with respect to a line normal to the longitudinal center of the sleeve. The holes 80 are also positioned to become successively aligned with the holes 69 on the rotation of the sleeve 72 with the alignment occurring in a regular cycle on uniform rotation. Also suitably secured to the sleeve 72 are a plurality of vanes 81 interposed between each line of holes 80 and parallel thereto. These vanes may be secured in position by a series of retaining members 83 suitably secured by screws or the like to the sleeve 72. The vanes project upwardly into close adjacency with the inner surface of the casing 60.

Figure 15:
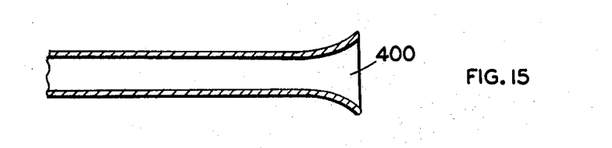
FIGS. 15, 16 and 17 are longitudinal cross sectional views of modifications of the probes.
Figure 16:
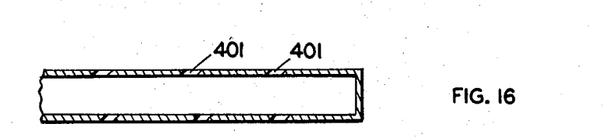
Figure 17:
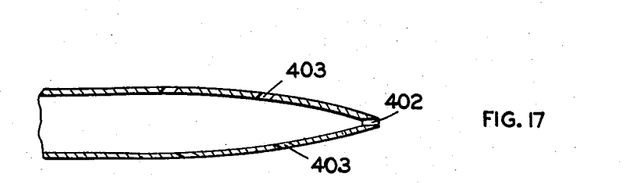

Positioned immediately below the distributor 60 and preferably suitably secured to the supporting plates 61 is an insulated steam plenum 90 (FIGS. 4 and 5). This steam plenum is provided with an insulating outer cover 93 supporting a cylindrical casing 91 preferably coextensive with the length of the distributor 60. A steam conduit is provided for conducting steam into the casing 91. The casing 91 is provided with a series of parallel preferably closely spaced steam probes 92. These steam probes 92 are preferably insulated up to their proximity with rolls 51 and nozzle 67 and are formed with openings at their free ends, and if desired, at longitudinal positions along the length of the probes, preferably close to their free end. The steam probes are elongated tubes which project well into the forward end 20 of the machine between the webs 40 and 41 with free ends terminating in the confined area 241 between the webs 40 and 41, at which point the desired thickness of the lamination to be formed is defined by the height of the space between the webs 40 and 41. The particular shape of the probes may be varied for improved results under various conditions. In FIGS. 15, 16 and 17 several variations are illustrated. FIGURE 15 illustrates a modification with a flared open end 400. This flared end reduces the pressure drop from the probe. The modification of FIG. 16 provides a series of openings 401 cut angularly into the probe along its length. This allows for a greater directional and distributional control of the steam as it flows from the probe. The modification of FIG. 7 has an opening 402 at its tapered end as well as angular openings 403 along its length. This permits distribution of more steam in selected directions under greater pressure.

Figure 18:
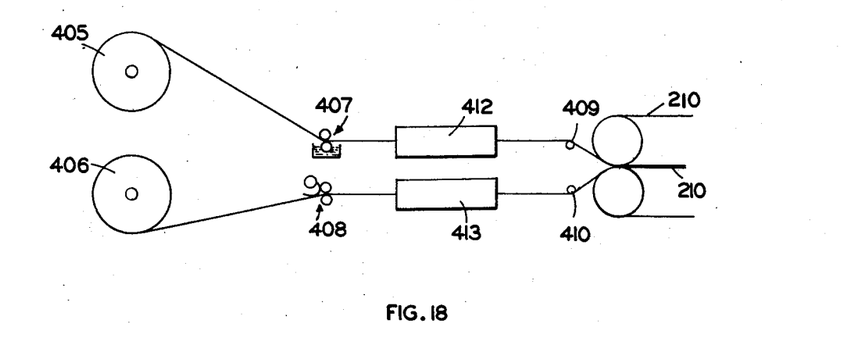
FIG. 18 is a schematic diagram of a suitable web let-off arrangement.

On occasion the the foamable material will be fed between webs having adhesive layers for greater adhesion of the foamable material to the webs, under such conditions a feed mechanism such as illustrated in FIG. 18 may be used. Here kraft paper webs in rolls 405 and 406 suitably journaled and supported are fed through suitable adhesive applicators 407 and 408. The webs then pass through suitable dryers 412 and 413 or the like and thence over idler rollers 409, 410 into the forward end of the machine and between the belts 102 and 103 and webs 40 and 41.

Figure 13:
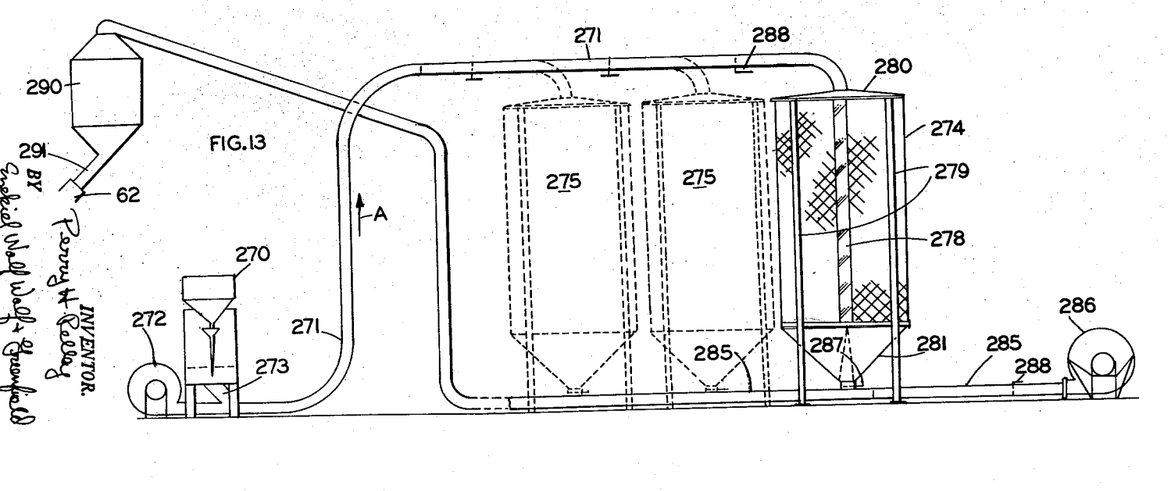
FIG. 13 is a plan view of a bead handling mechanism, with auxiliary hoppers shown in dotted.
Figure 14:
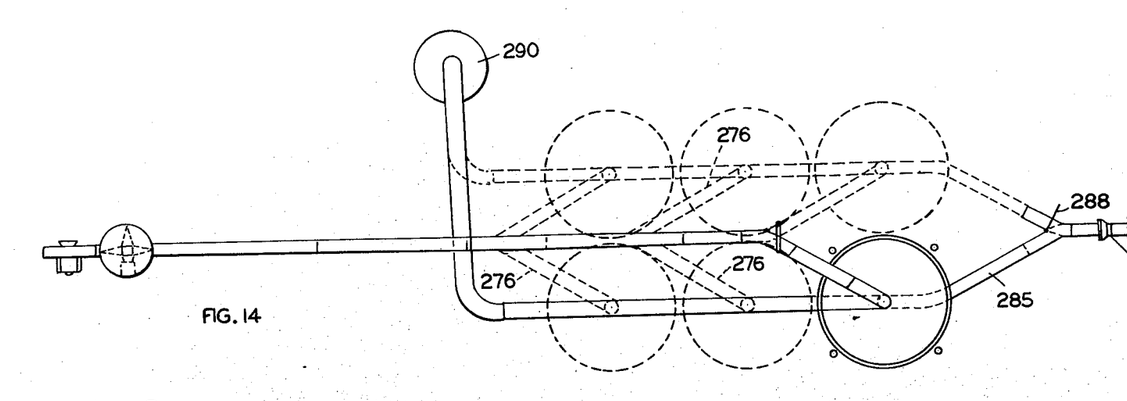
FIG. 14 is a top plan view of the arrangement shown in FIG. 13.

The foamable beads which are fed into the hopper 62 are preferably pre-expanded from a very dense bead having a diameter of perhaps 1/64 to a 1/32 of an inch, to a pre-expanded form of perhaps 1/16 of an inch or 3/32 of an inch. Since the machine operates at a rate capable of forming boxboard paneling at a rate of up to at least 50 linear feet per minute, provisions must be made for the storing of substantial quantities of these pre-expanded beads. A suitable storage system is illustrated in FIGS. 13 and 14. A pre-expander 270 of conventional design heats the dense polystyrene beads to their desired pre-expanded size. This pre-expander 270 is connected to the conduit 271 through the conduit 273. An air blower 272 at one end of conduit 271 is adapted to blow the pre-expanded beads entering through the conduit 273 from the pre-expander 270 through conduit 271 in the direction indicated by the arrow A. The conduit 271 terminates at the top of the storage hopper 274. If desired, a number of such hoppers indicated at 275 in dotted outline may also be provided and may be connected to conduit 271 by auxiliary feed lines 276. The hopper 274 is preferably formed of a fabric material having a loose, air permeable weave. A vertical transparent flexible section 278 of suitable material such as "Mylar" may be provided to indicate to the viewer the height of the beads contained within the hopper. The hopper 274 is confined between and supported by a plurality of posts 279 secured at their upper ends to the rigid roof 280 of the hopper. These posts 279 are suitably secured at their lower ends to the floor. The lower end of the hopper 274 fits into a conical receptacle 281, in turn connected to the conveying duct 285. This conveying duct 285 may have connected to it in series a plurality of such hoppers as indicated at 275. One end of the duct 285 is connected to the air blower 286. Valves 287 are provided to control the flow of preexpanded beads from the hoppers into the duct 285. Additional valve control means may be provided as illustrated at 288. Duct 285 is connected at its other end to the hopper control device. The hopper 290 is positioned above hopper 62 and is connected to it by ducts 291. Thus the preexpanded beads pass through the conduit 285 to hopper 290, and thence under the force of gravity from the hoppers 290 into the mouth of hopper 62.

In the preferred utilization of the invention, foamable laminates having kraft paper outer layers are formed. This kraft paper is suitably journaled and mounted in rolls for feeding over idler rolls into the forward end 20 of the machine. This paper in the form of opposite webs 100 and 101 is fed into the machine in facing relation, respectively with adjacent portions of webs 40 and 41 so that the surfaces of the confined area 241 are defined by these paper webs.

In the operation of this apparatus, polystyrene beads are fed into the hopper 62 from a suitable source such as indicated in FIGS. 13 and 14. These beads may be of the type described in the previously mentioned copending applications and patent. The beads, when fed into the hopper 62, are preferably preexpanded to an average diameter of a $3/32$ of an inch. The sleeve 72 is slowly rotated and a low air pressure is maintained in the air manifold 68 sufficient to cause beads in the hopper 62 to rotate and pass through the orifices 64. The air pressure from the air manifold 68 is cyclically delivered from the manifold through the holes 69 and 80 in the sleeve at a low flow rate sufficient to cause the beads to be propelled outwardly between the guide plates 65 and 66 and through the opening 168 between the paper webs 100 and 101. These beads pile up at the mouth of the confined area 241 in a slight excess as is illustrated at 300 (FIG. 5). Simultaneously, live dry steam is continuously fed under pressure, from the plenum 90 through the probes 92 to the interior of the confined area 241 defined by the webs 40 and 41. Simultaneously the restraining or conveying belts 102 and 103 are rotated with the adjacent portions of the belt moving rearwardly over the inner rails of the frame. These restraining belts carry the webs 40 and 41 thereby causing the surfaces defining the confined area between the belts to move rearwardly. Also carried rearwardly with the belts 102 and 103 as well as webs 40 and 41, by frictional engagement with the webs 40 and 41, are the kraft sheets 100 and 101. As the beads move rearwardly from the opening 168 of the distributor, they are enveloped by the live steam passing from the openings at the end of the steam probes 92. The beads are heated rapidly by this direct contact of heat supplied in situ causing them to foam rapidly and occupy the full volume of the confined space as illustrated at 105 and simultaneously coalesce (FIG. 5). The steam emerging from the probes heats from within, thus directly minimizing the loss of heat through conduction and also minimizing the amount of heat required to cause the foaming action. The insulating belts minimize the amount of steam required by retaining the steam during the crucial initial expansion period. After the expansion has occurred, as illustrated at 105, the insulating belts act as radiating control elements, as they move down the length of the machine, to prevent too rapid a cooling of the beads which could cause their collapse. The vented sides of the restraining belts 102 and 103 permit escape of air and spent steam but restrain the foaming beads within the confined area 241. Because of the cooperative action of the steam probes insulating belts, and restraining members, no special cooling mechanism is required other than the return cycle of the belts. Restraint of the panel is maintained while the beads are expanding.

The distributor mechanism described provides a uniform gentle feed of the beads to the machine. This is of some importance because the preexpanded polystyrene beads have a very low mass and unless the control of the beads is precise, there is excessive bouncing and undesirable movement of the beads as they pass to the interior of the apparatus.

The speed at which the machine can operate is dependent and related to a number of factors including the density of the board desired, its thickness and width. This in turn depends in part on the rate of feed and temperature of the steam, and the rate of feed and density of the beads.

The present apparatus and process herein described is capable of producing laminated panels having a core of foamed polystyrene and outer webs of kraft paper or the like at rates of speed substantially in excess of 50 feet per minute, with a density of one pound per cubic foot of foam material. Steam for example, may be fed into the confined area from the probes under pressures of 45 pounds.

Having now described the invention, I claim:

1. A machine for the continuous formation of a panel having a core of foamable material comprising a pair of parallel heat insulating endless webs, means mounting said webs for rotation with elongated sections of said webs horizontally disposed with spaced facing surfaces, means disposed on non-facing surfaces of said sections rigidly backing said surfaces, means for advancing said webs with said surfaces moving in the same longitudinal direction from a forward to a rear end of said machine, means for feeding and distributing a solid foamable material between said surfaces at said forward end, and means for introducing a fluid heating medium between said surfaces in a marginal area adjacent said forward end for enveloping said material in a heated atmosphere in said marginal area and causing said material to foam, said webs forming heat dissipative members adapted to slowly disperse and dissipate the heat from said fluid heating medium as said webs advance.

2. In a machine for the continuous formation of a panel having a core of foamable material, means mounting a pair of endless belts having backing plates for continuous longitudinal movement of successive segments thereof in closely spaced parallel planes defining a confined area, means supporting said plates with said segments non-yieldably restrained in said planes, a pair of insulating belts, one each circumscribing each of said backing plates with successive segments thereof adapted to move longitudinally through said confined area, a distributor adapted to contain solid foamable material with an elongated nozzle projecting between said planes for distributing said material, and means having a plurality of perforated tubular probes with said probes projecting between said planes in a marginal area adjacent said nozzle for feeding an activator for said foamable material into enveloping relation with said material.

3. A device as set forth in claim 2 wherein a nonpermeable continuous flexible belt circumscribes each of said endless belts with means positioning said flexible belt in facing relation with the plates of the belt it circumscribes in said confined area, said flexible belt adapted to heat insulate said confined area.

References Cited in the file of this patent

UNITED STATES PATENTS

| | | |
|---|---|---|
| 1,487,726 | Debay | Mar. 25, 1924 |
| 1,517,713 | Debay | Dec. 2, 1924 |
| 1,730,638 | Young | Oct. 8, 1929 |
| 1,777,043 | Lanhoffer et al. | Sept. 30, 1930 |
| 1,925,545 | Royle | Sept. 5, 1933 |

(Other references on following page)

UNITED STATES PATENTS

| | | |
|---|---|---|
| 2,142,932 | Beard | Jan. 3, 1939 |
| 2,243,058 | Wysong | May 20, 1941 |
| 2,602,960 | Fischbein | July 15, 1952 |
| 2,804,672 | Altachuler | Sept. 3, 1957 |
| 2,817,875 | Harris et al. | Dec. 31, 1957 |
| 2,841,205 | Bird | July 1, 1958 |
| 2,898,632 | Irwin et al. | Aug. 11, 1959 |
| 2,914,223 | Richter | Nov. 24, 1959 |
| 2,962,407 | Aykanian | Nov. 29, 1960 |
| 2,975,470 | Snelson et al. | Mar. 21, 1961 |
| 2,978,761 | Foye et al. | Apr. 11, 1961 |

FOREIGN PATENTS

| | | |
|---|---|---|
| 218,151 | Australia | Nov. 4, 1958 |
| 1,165,798 | France | June 2, 1958 |

OTHER REFERENCES

Koppers Booklet: "Drylite-Expandable-Polystyrene," 1954, pages 19–24.